(12) United States Patent
Oh

(10) Patent No.: US 7,703,736 B2
(45) Date of Patent: Apr. 27, 2010

(54) STAND FOR IMAGE DISPLAY DEVICE

(75) Inventor: Dae Sung Oh, Daegu-si (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 11/399,422

(22) Filed: Apr. 7, 2006

(65) Prior Publication Data

US 2007/0080271 A1 Apr. 12, 2007

(30) Foreign Application Priority Data

Oct. 6, 2005 (KR) ...................... 10-2005-0094024

(51) Int. Cl.
*A47G 29/00* (2006.01)
(52) U.S. Cl. ..................... 248/371; 248/133; 248/278.1; 248/163.1; 248/439; 248/398; 16/340; 16/221
(58) Field of Classification Search ................. 248/121, 248/917, 918, 919, 923, 291.1, 292.12, 284.1, 248/222.52, 280.11, 274.1, 371, 220.21, 248/133, 130, 139, 140, 144, 163.1, 439, 248/188.8, 122.1, 123.11, 222.13, 220.22; 361/681, 679.06; 16/340, 221, 319, 366, 16/DIG. 43, 337
See application file for complete search history.

(56) References Cited

U.S. PATENT DOCUMENTS 6,045,103 A * 4/2000 Costa et al. .............. 248/278.1

| | | | | |
|---|---|---|---|---|
| 6,227,518 B1 * | 5/2001 | Sun | ............................. | 248/371 |
| 6,264,152 B1 * | 7/2001 | Bloch et al. | .............. | 248/274.1 |
| 6,378,830 B1 * | 4/2002 | Lu | ........................... | 248/278.1 |
| 6,666,422 B1 * | 12/2003 | Lu et al. | .................. | 248/291.1 |
| 6,698,063 B2 * | 3/2004 | Kim et al. | ...................... | 16/337 |
| 2005/0050784 A1 * | 3/2005 | Bang et al. | ............... | 40/607.01 |
| 2005/0077439 A1 | 4/2005 | Quijano | | |
| 2007/0047188 A1 * | 3/2007 | Kim | ........................... | 361/681 |

FOREIGN PATENT DOCUMENTS

EP    1 420 327 A1    5/2004
JP      08-204348       8/1996

* cited by examiner

*Primary Examiner*—J. Allen Shriver
*Assistant Examiner*—Todd M. Epps
(74) *Attorney, Agent, or Firm*—Birch, Stewart, Kolasch & Birch, LLP

(57) ABSTRACT

A stand for an image display device is provided. The stand includes a leg unit. In the leg unit, a supporting member supports the image display device, a connecting member is coupled to the supporting member and rotatable in forward and backward directions with respect to the supporting member, and a base member supports the image display device with respect to a floor. The base member is rotatable in a direction different from the rotation directions of the connection member for being folded to a back of the image display device.

15 Claims, 6 Drawing Sheets

STAND FOR IMAGE DISPLAY DEVICE

BACKGROUND OF THE INVENTION

1. Field of the Invention

The present invention relates to a stand for an image display device, and more particularly, to a foldable stand for an image display device that can be folded to a back of the image display device from a bottom of the image display device when the image display device is packed, enabling more image display devices to be packed in the same space.

2. Description of the Related Art

Generally, image display devices, such as plasma display panels (PDPs) and Liquid Crystal Displays (LCDs), are provided with a stand for being placed on a floor.

Such a stand includes a supporting member fixed to a bottom portion of an image display device, and a base member connected to the supporting member for being placed on a floor. Usually, the base member is fixed with respected to the supporting member.

Meanwhile, the screen size of the image display devices becomes larger, and the thickness of the image display devices becomes smaller in order to satisfy user's demand.

As the image display device becomes larger and thinner, it becomes more important for users to prevent the image display device from falling down in a front direction when the image display device is placed on a floor, for the safety purpose.

It is preferable that the stand of the image display device have a wide base member to prevent the image display device from falling down in a front direction.

Particularly, the possibility of falling down of the image display device in a front direction can be reduced by increasing the width of the base member of the stand in a front-to-back direction of the image display device.

However, the stand of the related art is fixed to the image display device. Therefore, if the width of the base member of the stand is elongated in the front-to-back direction of the image display device, the packing size of the image display device increases when packing the image display device for transportation.

The increase of the packing size of the image display device lowers the number of packed image display devices that can be contained in the same space, thereby increasing physical distribution cost.

On the contrary, if the front-to-back width of the stand is reduced to increase the number of packed image display devices that can be contained in the same space, the image display device may easily fall down in a front or back direction when the image display device is place on a floor. This threatens the safety of customers and lowers the product stability.

To solve this problem, the image display device and the stand are separated from each other for packing. However, in this case, it is inconvenient for users to mounting the stand on the image display device before installing the image display device on a floor.

As described above, increasing the front-to-back width of the base member results in physical distribution cost increase because less image display devices are contained in the same space, and decreasing the front-to-back width of the base member results in the safety problem. Therefore, there is a need for an improved stand for the image display device that can increase the number of image display devices that can be packed and contained in the same space without lowering the safety of users.

SUMMARY OF THE INVENTION

Accordingly, the present invention is directed to a stand for an image display device that substantially obviates one or more problems due to limitations and disadvantages of the related art.

An object of the present invention is to provide a stand for an image display device, in which a base member can be folded to a back of the image display device when packing the image display device, so that more image display devices can be packed in the same space.

Another object of the present invention is to provide a stand for an image display device, in which a base member has an elongated front-to-back width for the safety of users when the stand is placed on a floor.

A further another object of the present invention is to provide a stand for an image display device that can be easily folded and disassembled for the convenience of users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for an image display device, including a leg unit, the leg unit including: a supporting member supporting the image display device; a connecting member coupled to the supporting member and rotatable in forward and backward directions with respect to the supporting member; and a base member supporting the image display device with respect to a floor, the base member being rotatable in a direction different from the rotation directions of the connection member for being folded to a back of the image display device.

According to the present invention, since the bottom of the stand can be folded to the back of the image display device for packing the image display device, more image display devices can be packed in the same space.

Further, the stand has an elongated front-to-back width, so that the image display device can be stably supported on a floor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
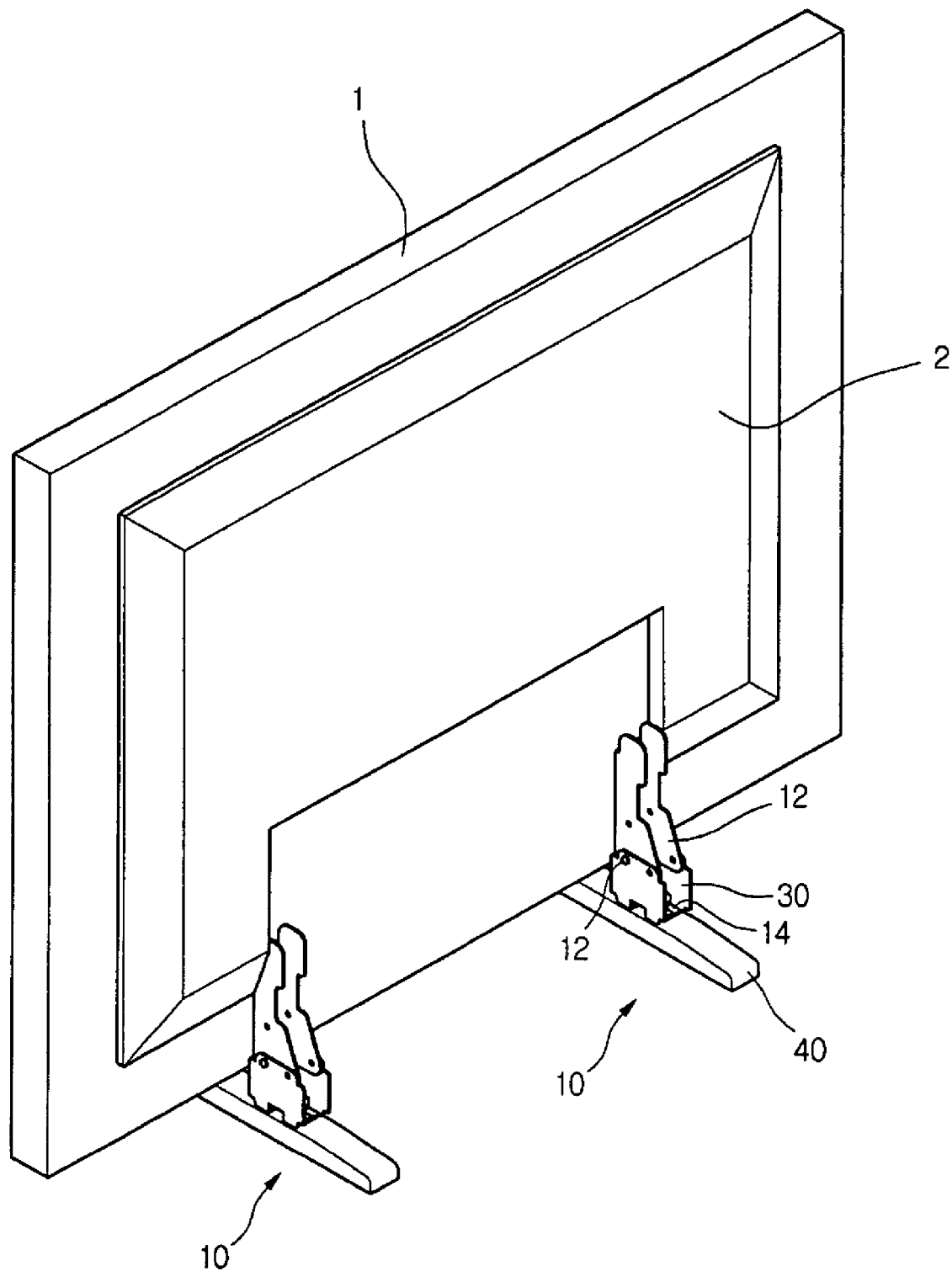
FIG. 1 is a present invention showing a stand installed to an image display device according to a first embodiment of the present invention.

FIG. 1 is a present invention showing a stand installed to an image display device according to a first embodiment of the present invention;

Referring to FIG. 1, a stand of the present invention includes a pair of identically-structured leg units 10 that are individually fixed to a lower portion of an image display device 1.

In detail, each of the leg units 10 includes a supporting member 20 (refer to FIG. 2) fixed to a lower portion of a back cover 2 of the image display device, a connecting member 30 rotatably connected to a lower portion of the supporting member 20, and a base member 40 rotatably connected to the connecting member 30 for standing on a floor.

The connecting member 30 is designed to rotate toward a back of the image display device 1 with respect to the supporting member 20.

Further, the base member 40 is designed to be placed at the back of the image display device 1 after being rotated in a direction different from the rotating direction of the connecting member 30

In more detail, the base member 40 is rotated in a direction perpendicular to the rotating direction of the connecting member 30.

As mentioned above, in the stand for the image display device 1, the connecting member 30, which is connected to supporting member 20 supporting the image display device 1, can be rotated toward the back of the image display device 1, and the base member 40 can be rotated in a direction different from the rotating direction of the connecting member 30 for being placed at a back lower portion of the image display device 1. Therefore, the image display device 1 occupies less space when it is packed.

In this structure of the stand of the present invention, the base member 40 of the stand is placed on a floor for standing the image display device 1 with respect to the floor, and the base member 40 is rotated for folding the stand to the back of the image display device for packing the image display device. Therefore, when the image display device is packed, the front-to-back width of the stand does not increase the packing size of the image display device, so that more image display devices can be packed into the same space.

The structure of the stand of the present invention will now be more fully described with reference to other drawings.

Figure 2:
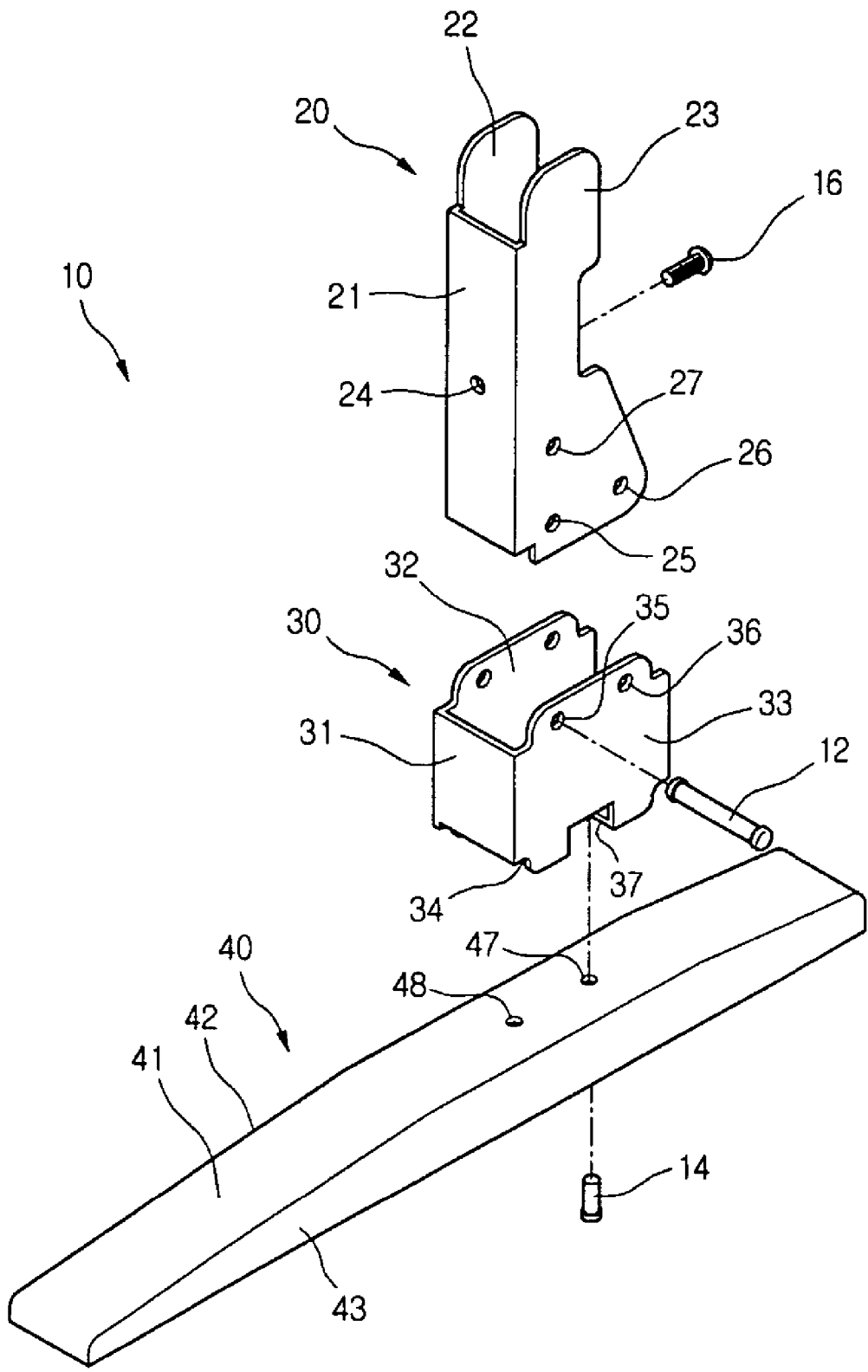
FIG. 2 an exploded perspective view of a stand for an image display device according to the present invention.

FIG. 2 an exploded perspective view of a stand for an image display device according to the present invention.

Figure 3:
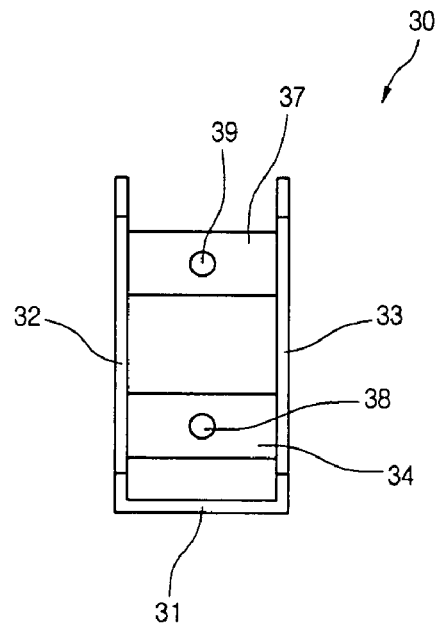
FIG. 3 a plan view of a connecting member depicted in FIG. 2.

FIG. 3 a plan view of a connecting member depicted in FIG. 2.

Figure 4:
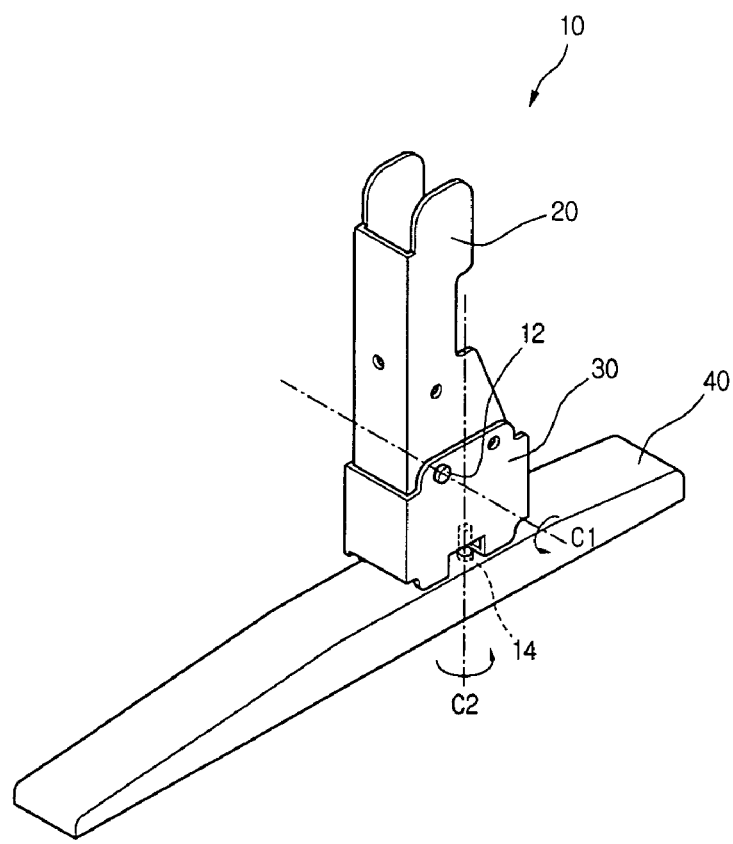
FIG. 4 is an assembled perspective view of a stand for an image display device according to the present invention.

FIG. 4 is an assembled perspective view of the stand depicted in FIG. 2.

Referring to FIGS. 2 through 4, the leg unit 10 of the stand of the present invention includes the supporting member 20, the connecting member 30, and the base member 40.

In detail, the supporting member 20 includes a forward-facing front portion 21 abutted on the back cover 2 of the image display device 1, and two side portions 22 and 23 extending from both sides of the front portion in a backward direction.

Here, the front portion and the two side portions 22 and 23 are plate-shaped with a "☐"-shaped section.

In detail, the front portion has a vertically elongated rectangular plate shape with a back surface fixing hole 24 at a center thereof.

Referring to FIG. 2, the back surface fixing hole 24 receives a fastening member 16 such as a screw therethrough. The fastening member 16 is fixed to a lower portion of the back cover 2 of the image display device 1 for fixing the supporting member 20 to the image display device 1.

When viewed in FIG. 2, the side portions 22 and 23 includes a left side portion 22 extending a left side edge of the front portion 21, and a right side portion 23 extending from a right side edge of the front portion 21.

Preferably, the left and right side portions 22 and 23 are corresponding and parallel with each other.

The left and right side portions 22 and 23 are perpendicular to the front portion 21. Therefore, the supporting member 20 can stably support the image displaying device in a vertically standing position though the supporting member 20 is formed of a thin plate material.

Meanwhile, the left and right side portions 22 and 23 include first hinge holes 25 though lower portions to receive a first hinge shaft 12. Preferable, the first hinge holes 25 are adjacent to the front portion 21.

Meanwhile, the connecting member 30 is disposed under the supporting member 20.

The connecting member 30 includes a front portion 31 having a rectangular plate shape and facing in a front direction when the stand is erected, and two parallel side portions 32 and 33 extending from both sides of the front portion 31 in a backward direction.

The front portion 31 of the connecting member 30 is placed substantially in parallel with the front portion 21 of the supporting member 20 when the stand is erected.

Meanwhile, the two side portions 32 and 33 of the connecting member 30, as shown in FIG. 2, extend from both side edges of the front portion 31 in a backward direction.

Lower portions of the two side portions 32 and 33 are perpendicularly bent to meet both ends of two surfaces 34 and 37.

In detail, when viewed in FIG. 2, the side portions 32 and 33 include a left side portion 32 extending from a left side edge of the front portion 31, and a right side portion 33 extending from a right side edge of the front portion 31.

Since the left and right side portions 32 and 33 are perpendicular to the front portion 31, the connecting member 30, which is formed of a thin plate material, can stably support the image display device 1.

The left and right side portions 32 and 33 define first hinge holes 35 through upper portions thereof.

When assembled, the first hinge holes 35 of the connecting member 30 are aligned with the first hinge holes 25 defined in the lower portion of the supporting member 20.

The hinge shaft 12 is inserted into the first hinge holes 25 and 35 that are aligned, such that the connecting member 30 can be rotatably coupled to the supporting member 20.

Here, the first hinge holes 35 of the connecting member 30 are disposed outside the first hinge holes 25 of the supporting member 20.

Meanwhile, it is preferable that there be a predetermined frictional force between the supporting member 20 and the connecting member 30.

The frictional force may be caused by the first hinge 12. Further, the frictional force may be caused from a contact surface between the supporting member 20 and the connecting member 30.

Owing to the predetermined frictional force between the supporting member 20 and the connecting member 30, the supporting member 20 can safely support the image display device 1 when the stand is placed on a floor, and the connecting member 30 can maintain its position after it is rotated.

Meanwhile, the supporting member 20 and the connecting member 30 include a first matching portion, such that standing and folded positions of the supporting member 20 and the connecting member 30 can be checked.

When the stand is in a standing position, it can be checked whether the supporting member 20 and the connecting member 30 are exactly parallel or not by using the first matching portion. Further, when he stand is in a folded position, it can be checked whether the supporting member 20 and the connecting member 30 are perpendicular or not by using the first matching portion.

In detail, the first matching portion includes horizontal matching holes 26 and vertical matching holes 27 that are defined in the supporting member 20, and first matching holes 36 defined in the connecting member 30.

The horizontal matching holes 26 and the first hinge holes 25 are horizontally aligned at a predetermined distance from each other.

The vertical matching holes 27 and the first hinge holes 25 are vertically aligned. The vertical matching holes 27 and the first hinge holes 25 are spaced the same distance as the horizontal matching hole 26 and the first hinge holes 25.

Meanwhile, the first matching holes 36 of the connecting member 30 are horizontally aligned with the first hinge holes 35.

The first matching holes 36 and the first hinge holes 35 are spaced the same distance as the horizontal matching holes 26 and the first hinge holes 25 of the supporting member 20.

When the supporting member 20 and the connecting member 30 are coupled by the first hinge shaft 12, and the stand is in the standing position, the horizontal matching holes 26 of the supporting member 20 are aligned with the first matching holes 36 of the connecting member 30.

By checking the alignment between the horizontal matching holes 26 and the first matching holes 36, it can be determined that the stand is correctly erected.

Here, a fastening member such as a rod can be inserted through the first matching holes 36 and the horizontal matching holes 26 that are aligned in the standing position of the stand, in order to lock the supporting member 20 and the connecting member 30 in the standing position.

Meanwhile, when the connecting member 30 is rotated 90 degrees with respect to the supporting member 20, the first matching holes 36 are aligned with the vertical matching holes 27.

Therefore, when the stand is folded, it can be determined whether the connecting member 30 is folded perpendicular to the supporting member 20 or not by checking the alignment between the first matching holes 36 and the vertical matching holes 27.

Further, when the connecting member 30 is folded, a fastening member such as a rod can be inserted through the first matching holes 36 and the vertical matching holes 27 that are aligned, in order to lock the supporting member 20 and the connecting member 30 in the folded position.

Meanwhile, the first matching portion can be constructed in a shape different from the hole shape.

For example, inwardly protruded circular bosses can be formed on the connecting member 30 instead of the first matching holes 36.

In this case, when the stand is placed on a floor in its standing position, the bosses may be inserted into the horizontal matching holes 26, such that the stand can be kept in the standing position.

Further, when the connecting member 30 is rotated 90 degrees with respect to the supporting member 20, the bosses, as a stopping structure, may be inserted into the vertical matching holes 27 to lock the connecting member 30.

Meanwhile, referring to FIGS. 2 and 3, the lower ends of the left and right side portions 22 and 23 of the supporting member 20 are abutted on the two surfaces 34 and 37 that are perpendicular to the left and right side portions 22 and 23. Here, the two surfaces 34 and 37 may be formed in one piece.

The two surfaces 34 and 37 define holes 38 and 39 at center portions, respectively.

One of the two holes 38 and 39 adjacent to the front portion 31, that is, the hole 38, is a second matching hole of a second matching portion (described later).

Further, the other hole 38 is a second hinge hole about which the base member 40 rotates (described later).

The second hinge hole 39 receives a second hinge shaft 14.

Meanwhile, the base member 40 of the stand, which is to be placed on a floor, is elongated in a front-to-back direction of the image display device 1. The base member 40 includes a top portion 41 approximately parallel with a floor when the base is placed with the floor, and a pair of vertical side portions 42 and 43 running the length of the base member 40 under the top portion 41.

Referring to FIG. 2, the top portion 41 has a rectangular plate shape with a center parallel with the connecting member 30 and surfaces sloped down from the center toward the front and back of the image display device 1.

The base member 40 defines two holes 48 and 47 in the top portions 41 in correspondence with the two holes 38 and 39 defined in the bottom of the connecting member 30.

One of the two holes 48 and 47 located at a front position, that is, the hole 48, makes up the second matching portion together with the second matching hole 38. The other hole 47 couples with the second hinge shaft 14 such that the base member 40 can be rotated thereon.

Meanwhile, since the top portion 41 is elongated in the front-to-back direction of the image display device, contacting surface between the base member 40 and a floor can be increased. Therefore, the base member 40 can support the image display device more firmly, preventing the image display device from falling down.

Here, as the top portion 41 becomes longer, the possibility of overturning the image display device reduces.

Meanwhile, when viewed in FIG. 2, the side portions 42 and 43 of the top portion 41 includes a left side portion 42 extending downwardly in a vertical direction from a left edge of the top portion 41, and a right side portion 43 extending downward in a vertical direction from a right edge of the top portion 41.

Preferably, the left and right side portions 42 and 43 are integrated with the top portion 41.

The second hinge hole 47 defined in a center of the top portion 41 is aligned with the second hinge hole 39 of the connecting member 30, and the second hinge shaft 14 is inserted through the aligned two hinge holes 47 and 39.

Therefore, the base member 40 can be rotated in a direction perpendicular to the rotating direction of the connecting member 30.

This coupling between the connecting member 30 and the base member 40 allows 360-degree rotation of the base member 40 about the second hinge shaft 14 with respect to the connecting member 30.

Here, it is preferable that there be a predetermined frictional force between the connecting member 30 and base member 40.

The predetermined frictional force may be generated by the second hinge shaft 14 or the contact surface between the connecting member 30 and base member 40.

Owing to the predetermined frictional force, the connecting member 30 and the base member 40 can safely support the image display device when the stand is placed on a floor, and the base member 40 can maintain its position after it is rotated.

The connecting member 30 and the base member 40 include the second matching portion such that the standing position and folded positions of the connecting member 30 and the base member 40 can be checked.

The second matching portion includes the second matching hole 38 defined in the surface 34 located on the bottom of the connecting member 30, and the hole 48 (base matching hole) defined in a top center of the base member 40.

The second matching hole 38 is spaced a predetermined distance from the second hinge hole 39.

Meanwhile, the base matching hole 48 of the base member 40 is located in front of the second hinge hole 47 defined in the top center of the base member 40.

The distance between the base matching hole 48 and the second hinge hole 47 is the same as the distance between the second matching hole 38 and the second hinge hole 39 of the connecting member 30.

Here, when the connecting member 30 is connected with the base member 40 by the second hinge shaft 14 and the stand is placed on a floor, the second matching hole 38 is vertically aligned with the base matching hole 48 of the base member 40.

Accordingly, when the stand is erected, it can be determined whether the stand is correctly erected or not by checking the vertical alignment of the second matching hole 38 of the connecting member 30 with the base matching hole 48.

Here, when the stand is erected, a coupling member such as a rod can be inserted into the base matching hole 48 and the second matching hole 38 that are vertically aligned, in order to prevent relative rotation between the connecting member 30 and the base member 40.

Meanwhile, the second matching portion can be formed in a different shape.

For example, an inwardly protruded circular boss can be provided instead of the base matching hole 48.

In this case, the circular boss is inserted into the second matching hole 38 when the stand is erected on a floor for maintaining the standing position of the stand firmly.

An operation of the stand for the image display device will now be described.

FIGS. 4 to 7 sequentially show the positions of the stand from a standing position to a folded position according to the present invention.

In detail, FIG. 4 is a perspective view showing the leg unit 10 of the stand when the leg unit 10 is in a standing position according to the present invention.

Figure 5:
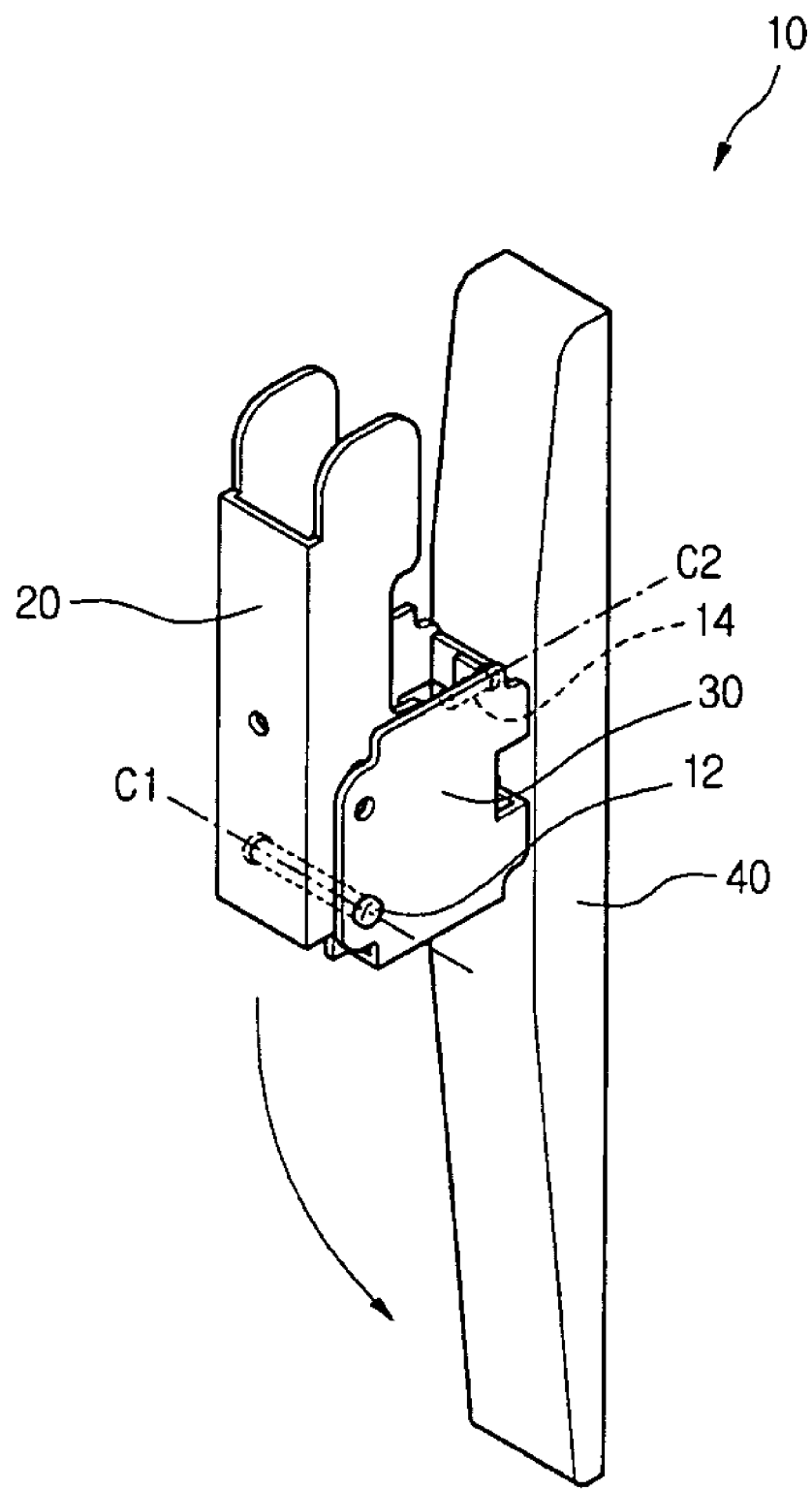
FIGS. 5 to 7 are perspective views showing a folding motion of a stand for an image display device according to the present invention.

FIG. 5 shows the leg unit 10 of the stand when the connecting member 30 is rotated 90 degrees with respective to the supporting member 20.

Figure 6:
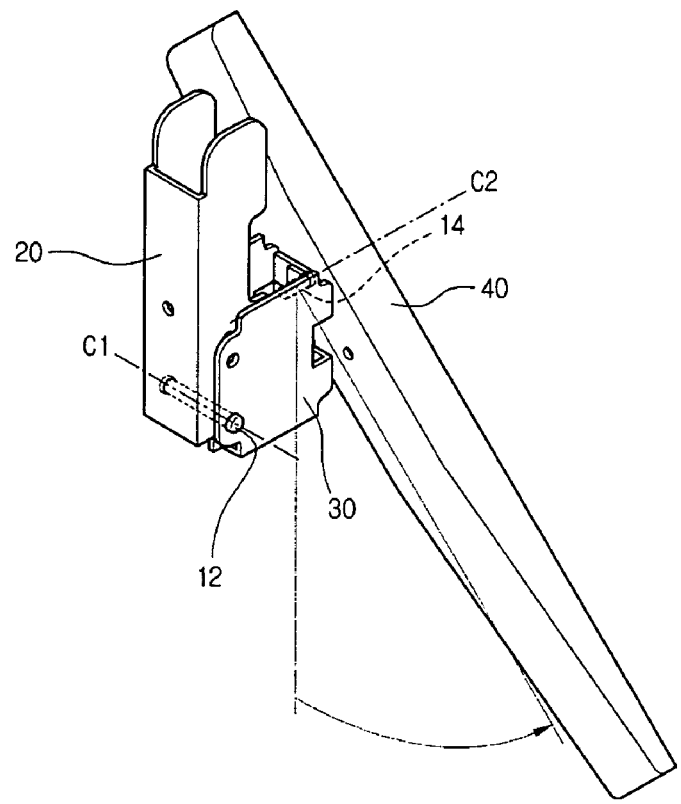

FIG. 6 shows the leg unit 10 of the stand when the base member 40 is rotating with respect to the connecting member 30.

Figure 7:
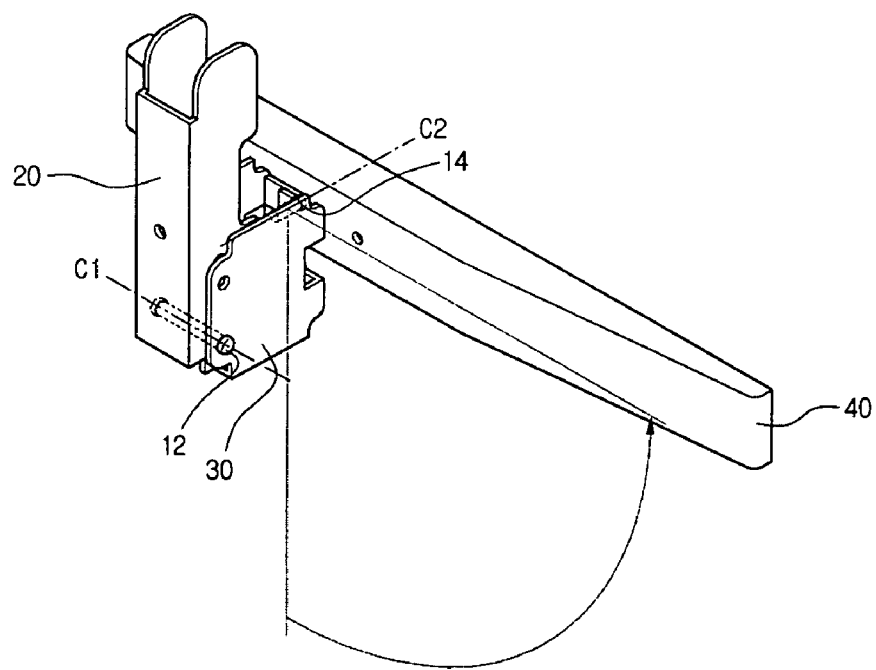

FIG. 7 shows the leg unit 10 of the stand when the base member 40 is rotated 90 degrees with respect to the connecting member 30.

Figure 8:
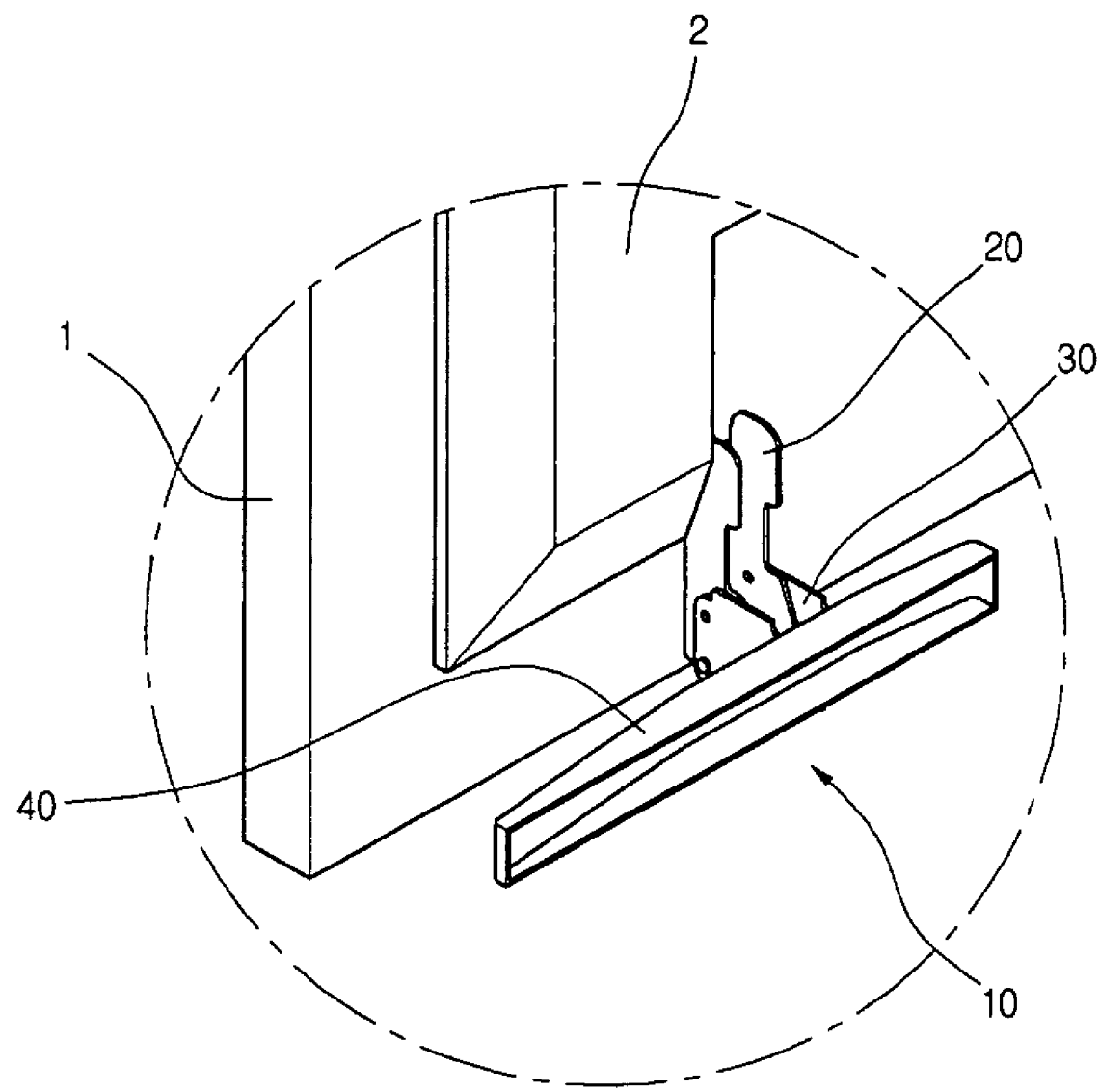
FIG. 8 is a partial perspective view showing a stand folded on a back of an image display device.

FIG. 8 shows the leg unit 10 of the stand installed on a back of the image display device in the folded position as shown in FIG. 7.

Packing procedures for an image display device placed on a floor will now be described.

First, the base member 40 of the stand installed on a bottom of the image display device is folded toward a back of the image display device.

Procedures for folding the stand of the present invention will now be described with reference to FIGS. 4 to 7. In FIGS. 4 to 7, rotation centered on the first hinge shaft 12 is denoted with C1, and rotation centered on the second hinge shaft 14 is denoted with C2.

Referring to FIG. 4, when the stand of the present invention is placed on a floor, the supporting member 20 and the front portion connecting member 30 are aligned in a line.

Here, the base member 40 is placed on the floor and extending under the connecting member 30 in a front-to-backward direction of the image display device.

When a user intends to fold the stand, the user can lay down the image display device and rotate the base member 40 of the stand in a direction to the back of the image display device (in a counterclockwise direction in FIG. 4).

Here, the connecting member 30 and the base member 40 are rotated about the first hinge shaft 12 (C1) as shown in FIG. 5.

When the connecting member 30 is rotated 90 degrees with respect to the supporting member 20, a back surface of the front portion 31 of the connecting member 30 comes into contact with a bottom of the supporting member 20, and thus the connecting member 30 is not rotated any more. In this way, the rotation of the connecting member 30 can be stopped.

In this state, the base member 40 is rotated in a counterclockwise direction indicated with arrow in FIG. 5. The counterclockwise rotation of the base member 40 is perpendicular to the rotation direction of the connecting member 30.

FIG. 6 shows the rotating base member 40 when it is rotated about 45 degrees.

The rotation of the base member 40 continues until the base member 40 is rotated 90 degrees with respect to the connecting member 30.

Here, the base member 40 can be rotated more than 90 degrees with respect to the connecting member 30.

However, it is preferable that the base member 40 be rotated until the base member 40 is parallel with a lower edge of the back cover of the image display device when the stand is folded.

Therefore, according to an embodiment of the present invention, the stand is constructed such that the stand can be folded until the base member 40 makes an angle of 90 degrees with the connecting member 30.

FIG. 7 shows the stand of the present invention when the base member 40 is rotated 90 degrees with respect to the connecting member 30.

When the base member 40 is rotated 90 degrees with respect to the connecting member 30 as shown in FIG. 7, the base member 40 is approximately parallel with a lower edge of the image display device in the case where the stand is installed on the back of the image display device.

FIG. 8 shows the stand when the stand is folded on the back of the image display device in parallel with the lower edge of the image display device.

When it is intended to transport the image display device, the stand can be folded to the back of the image display device as shown in FIG. 8, so that the packing size of the image display device can be reduced. Therefore, more image display devices can be transported.

Further, even when the image display device has a projected portion at its back, the stand can be properly folded and kept in the folded position according to the above-mentioned folding configuration since the folded stand is located at a lower portion of the image display device.

Meanwhile, when it is intended to install the folded stand on a floor, the base member 40 of the folded stand is rotated 90 degrees in a clockwise direction (the opposite direct of arrow in FIG. 7).

Next, both the connecting member 30 and the base member 40 are rotated clockwise by 90 degrees, such that the folded stand can be easily unfolded.

Therefore, the image display device can be stably placed on the floor by unfolding the leg unit of the stand and placing the leg unit on the floor in this way.

The base member 40 of the stand has a bottom surface elongated in a front-to-back direction of the image display device with respect to the floor to prevent the image display device from falling down in front and back directions, so that the image display device can be stably maintained when the image display device is placed on the floor.

Here, the elongated length of the bottom surface of the base member 40 can be increased further more for the safety of users.

According to the stand of the present invention, the connecting member is rotated backward with respect to the supporting member toward the back cover of the image display device, and the base member is rotated with respective to the connecting member in parallel with the back of the image display device. These folding motions of the connecting member and the base member are conducted about the hinge shafts of the supporting member and the connecting member, respectively, such that the folding motions can be conducted regardless of the floor-contact length elongated in the front-to-back direction.

It will be apparent to those skilled in the art that various modifications and variations can be made in the present invention. Thus, it is intended that the present invention covers the modifications and variations of this invention provided they come within the scope of the appended claims and their equivalents.

As described above, according to the stand for the image display device of the present invention, the bottom surface of the stand can be folded to the back of the image display device when the image display device is packed, thereby maximizing the number of packed image display devices that can be contained in the same space.

Further, the image display device can be stably supported when it is placed on a floor owing to the elongated width of the stand in the front-to-back direction of the image display device screen.

What is claimed is:

1. A stand for an image display device, comprising a leg unit, the leg unit comprising:

a supporting member supporting the image display device;

a connecting member coupled to the supporting member and rotatable in forward and backward directions with respect to the supporting member; and a base member connected to the connecting member for supporting the image display device with respect to a floor, the base member being rotatable with respect to the connecting member, wherein the base member, connection member and supporting member are arranged so that a second rotation shaft of the base member with respect to the connection member is configured to cross a first rotation shaft of the connection member with respect to the supporting member, and the base member is rotatable in a direction perpendicular to an axis of the first rotation shaft so as to fold the base member to a back of the image display device, and the base member placed at a back lower portion of the image display device in a state of being folded on the back of the image display device, and the supporting member comprises a first front portion abutted on the back of the image display device, and two first side portions extending from both sides of the first front portion in a perpendicular direction with respect to the first front portion, and a vertical matching hole and a horizontal matching hole formed on the at least one first side portion, wherein the vertical matching hole and the horizontal matching hole are formed in a same distance with respect to the first rotation shaft respectively in a vertical direction and a horizontal direction, and the connecting member comprises a second front portion arranged in collateral with the first front portion in the state for standing the image display device with respect to the floor, and two second side portions extending from both sides of the second front portion in a perpendicular direction with respect to the second front portion, and a first matching hole formed on the at least one second side portion, wherein the first matching hole is formed in a distance from the first rotation shaft, the distance of the first matching portion is same the distances of the vertical and horizontal hole, and the first matching hole is matched with the horizontal matching hole in a stand state of the stand, and the first matching hole is matched with the vertical matching hole in a folding state of the stand.

2. The stand according to claim 1, wherein the stand comprises a pair of leg units provided on a bottom portion of the image display device.

3. The stand according to claim 1, wherein the base member comprises a forwardly extending portion for being placed on the floor to prevent the image display device from falling down in a forward direction.

4. The stand according to claim 1, wherein the base member comprises a backwardly extending portion for being placed on the floor to prevent the image display device from falling down in a backward direction.

5. The stand according to claim 1, wherein the connecting member and the base member comprise a second matching portion for checking standing and rotating states of the connecting member and the base member.

6. The stand according to claim 1, wherein the connecting member is rotatable 90 degrees with respect to the supporting member.

7. The stand according to claim 1, wherein the base member comprises a hinge shaft formed at a bottom end of the connecting member.

8. The stand according to claim 1, a rotation angle for reward folding of the connecting member with respect to the supporting member is restricted by a contact between the second front portion of the connecting member and the a bottom of the supporting member.

9. The stand according to claim 1, wherein the base member extends in forward and backward direction with respect to the image display device, and the base member is placed between the image display device and floor in a state for standing the image display device with respect to the floor.

10. The stand according to claim 1, wherein a horizontal elongation length of the side portions is larger than a vertical elongation length of the second front portion.

11. The stand according to claim 1, wherein the first rotation shaft penetrates the first side portions and the second side portion, and the first rotation shaft is located in a forwardly eccentric portion from a center of the second side portion.

12. A stand for an image display device, comprising a pair of leg units supporting the display device, each of the leg unit comprising:
a supporting member fixed to a bottom portion of the image display device;
a connecting member coupled to the supporting member and rotatable in forward and backward directions of the supporting member; and
a base member coupled to an end of the connecting member for supporting the image display device with respect to a floor, the base member being rotatable with respect to the connecting member,
wherein the base member, connection member and supporting member are arranged so that a second rotating shaft of rotation of the base member with respect to the connecting member is configured to cross a first rotating shaft of rotation of the connecting member with respect to the supporting member, and
the base member is rotatable in a direction perpendicular to an axis of the first shaft of rotation of the connecting member so as to fold the base member to a back of the image display device, and
the base member extended in forward and backward direction with respect to the image display device, and placed between the image display device and floor in a state for standing the image display device with respect to the floor, and
the base member placed at a back lower portion of the image display device in a state of being folded on the back of the image display device, and
the supporting member comprises a first front portion abutted on the back of the image display device, and two first side portions extending from both sides of the first front portion in a perpendicular direction with respect to the first front portion, and a vertical matching hole and a horizontal matching hole formed on the at least one first side portion, wherein the vertical matching hole and the horizontal matching hole are formed in a same distance with respect to the first rotation shaft respectively in a vertical direction and a horizontal direction, and
the connecting member comprises a second front portion arranged in collateral with the first front portion in the state for standing the image display device with respect to the floor, and two second side portions extending from both sides of the second front portion in a perpendicular direction with respect to the second front portion, and a first matching hole formed on the at least one second side portion, wherein the first matching hole is formed in a distance from the first rotation shaft, the distance of the first matching portion is same the distances of the vertical and horizontal hole, and
the first matching hole is matched with the horizontal matching hole in a stand state of the stand, and the first matching hole is matched with the vertical matching hole in a folding state of the stand.

13. The stand according to claim 12, wherein the base member comprises an elongated bottom portion extending in forward and backward directions of the image display device for preventing the image display device from falling down when the image display device is placed on the floor.

14. The stand according to claim 12, wherein the base member comprises a hinge shaft formed at a top center in perpendicular to the floor.

15. The stand according to claim 1, wherein the base member arranged in a parallel direction with lower edge of the image display direction in the state of being folded on the back of the image display device.

* * * * *